US006195559B1

(12) United States Patent
Rapeli et al.

(10) Patent No.: US 6,195,559 B1
(45) **Date of Patent: *Feb. 27, 2001**

(54) COMMUNICATION SYSTEM, A PRIMARY RADIO STATION, A SECONDARY RADIO STATION, AND A COMMUNICATION METHOD

(75) Inventors: Juha Rapeli, Change (FR); Kars-Michiel H. Lenssen, Eindhoven (NL)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,069

(22) Filed: Nov. 19, 1998

(30) Foreign Application Priority Data

Nov. 26, 1997 (EP) ........................................ 97402851

(51) Int. Cl.[7] ............................ H04B 5/02; H04B 7/02

(52) U.S. Cl. ....................... 455/500; 455/13.3; 455/101; 455/123; 455/562; 342/359; 342/372; 342/434; 342/445

(58) Field of Search ................................ 455/500, 420, 455/575, 562, 13.3, 14, 25, 101, 121, 192, 447, 561, 90, 277.1, 277.2, 550; 342/359, 432, 357, 74, 372, 374, 445, 448, 434, 437

(56) References Cited

U.S. PATENT DOCUMENTS 4,670,906 * 6/1987 Thro ................................ 455/500
4,743,913 * 5/1988 Takai ................................ 342/357
5,101,407 * 3/1992 Harvey et al. ....................... 455/500
5,233,643 * 8/1993 Naeini et al. ....................... 455/500
5,648,961 * 7/1997 Ebihara ................................ 455/562
5,680,141 * 10/1997 Didomenico et al. ............... 342/372
5,790,075 * 8/1998 Inugai et al. ........................ 342/359
5,898,382 * 4/1999 Treatch ............................... 455/447
5,966,641 * 10/1999 Flowerdew ........................... 455/41
6,009,124 * 12/1999 Smith et al. ........................ 455/562

FOREIGN PATENT DOCUMENTS

0800319A1 10/1997 (EP) ................................ H04Q/7/22
WO9608850 3/1996 (WO) .............................. H01Q/3/26

OTHER PUBLICATIONS

Japanese Abstract 06260821A, Sep. 16, 1994, Class H01Q, subclass 3/24.

By K. Fujimoto et al., "Mobile Antenna Systems Handbook" Artech House, Inc., 1994, pp. 436–451.

EP Applic. No. 97202104.2, filed Jul. 8, 1997 (PHN 16,435 EP–P).

* cited by examiner

*Primary Examiner*—Lee Nguyen
*Assistant Examiner*—Simon Nguyen

(57) ABSTRACT

A communication system has a primary radio station and a portable radio station. The primary radio station communicates with the portable radio station. The portable radio station is freely three-dimensionally orientable with respect to a fixed coordinate system. The portable radio station has a transceiver, a controllable antenna structure, and a beam directional controller for three-dimensionally controlling a beam radiated by the controllable antenna structure. The portable radio station further has a three-dimensional geometric sensor for three-dimensionally sensing a local magnetic field. The beam is controlled on the basis of the sensed local magnetic field. Beam control is such that, after an initial adjustment of the beam into a given direction with respect to a main axis of the portable radio station, the controllable antenna structure substantially retains the beam directed into the given direction, irrespective of a subsequent orientation of the portable radio station with respect to the fixed coordinate system.

17 Claims, 5 Drawing Sheets

COMMUNICATION SYSTEM, A PRIMARY RADIO STATION, A SECONDARY RADIO STATION, AND A COMMUNICATION METHOD

BACKGROUND OF THE INVENTION

1. Field of the Invention

The present invention relates to a communication system. Such a communication system can be a cellular or cordless telephony system, or any other suitable system. The system can be a terrestrial and/or satellite cellular mobile radio system in which the one radio station can be a radio base station in a terrestrial network or a mobile terminal, and the other radio station can be a satellite. The system can be an analog or digital system. In the event of a digital system, the system can be a so-called FD/TDMA-system (Frequency Division/Time Division Multiple Access), a CDMA-system (Code Division Multiple Access), or a mixed FD/TDMA- and CDMA-system, or any other suitable system.

The present invention further relates to a primary and a secondary radio station and a radio communication method for use in such a communication system.

2. Description of the Related Art

A communication system of the above kind is known from the handbook "Mobile Antenna Systems Handbook", K. Fujimoto et al., Artech House, Inc., 1994, pp. 436–451. The known system is a land mobile satellite communications system in which the primary radio stations are satellites and the secondary radio stations are mobile radio station in a vehicle. The secondary radio stations comprise a phased-array antenna as a controllable antenna structure. At pages 438–441 a satellite tracking method is described. The phased-array antenna is controlled on the basis of sensing information acquired by an optical-fibre gyro and a geomagnetic sensor, the sensing information being used in an open-loop control method. As is described on page 441, the geomagnetic sensor is used for sensing an absolute direction to calibrate the cumulative angular error of the optical-fibre gyro which can only sense relative directional variations. Optical-fibre gyros are relatively expensive or to slow to follow quick movements. Furthermore, measuring the absolute direction of the earth magnetic field is subject to static and dynamic magnetic field disturbances caused by the vehicle passing large buildings containing metal, inter alia. Also, since the earth magnetic field varies in a compicated way with geograpic position, sophisticated correction methods are needed, often requiring expensive additional sensors. It is at least difficult or even not feasible to implement the known method in a portable radio station such as a cellular radio handset which can be freely and rapidly oriented in different positions with respect to a fixed coordinate system.

SUMMARY OF THE INVENTION

It is an object of the present invention to provide a communication system of the above kind having a robust and cheap control mechanism for directing radiation of a controllable antenna structure in a freely orientable secondary radio station in a direction providing optimum conditions for communication.

To this end the communication system according to the present invention comprises a portable radio station which can be freely oriented with respect to a fixed coordinate system, the portable radio station comprising a controllable antenna structure, a three dimensional geomagnetic sensor for three-dimensionally sensing a local magnetic field, control means for controlling the controllable antenna structure on the basis of sensing information obtained with the three dimensional sensor, such that, after initial adjustment of the controllable antenna structure to a predetermined direction, the antenna structure substantially retains its radiation directed in the predetermined direction, irrespective of subsequent orientation of the portable radio station. The present invention is based upon the insight that, after initial adjustement of the controllable antenna structure in a defined direction such as an orientation direction in a line from the secondary station to a primary station, at least in principle, steering of the controllable antenna structure purely on the basis of information about the relative direction of the local magnetic field at the location of the secondary radio station gives a very robust control. It is realised that such a control, in principle, is independent of the geographical position of the secondary radio station and can be made insensitive to static magnetic disturbances superimposed on the local earth magnetic field. Preferably, the three dimensional sensor is a sensor using three, preferably orthogonal, AMR (Anisotropic Magneto Resistive) magnetic field sensor elements which are cheap and have a very fast real time response characteristic. If all sensor elements should be mounted on a single substrate, one of the AMR-sensor-elements could be replaced by a Hall-effect sensor element. Such a type of a three dimensional sensor, and electronics to process sensing information, is described in the still unpublished European patent application of the same Applicant, European Application No. 97202104.2, filed Jul. 8, 1997, the contents of this patent application herewith being incorporated by refrence in the present patent application. From three output signals of the three-dimensional sensor, the magnitude of the total field strength can be determined. Herewith, it can be checked whether, due to a strong local dynamic disturbance, there is a sudden change in the local magnetic field. In such an event, an appropriate correction and possibly re-calibration procedure could be initiated as used for the initial adjustment. Because of the ability of a secondary radio station to directionally radiate to radio station in a network, in principle, once a radio link has been established, either in idle mode or in call mode, without using substantial exchange of information via such a link, a considerable power consumption reduction is achieved in the secondary radio station. Particularly for a portable communication device this means longer standby time and/or longer connection time.

Further embodiments are claimed in the dependent claims. The further embodiments are mainly directed to the solving of the remaining problem how to initially adjust the controllable antenna structure to the predetermined direction, e.g. from a mobile station in a cellular radio system to a radio base station, which can be a terrestrial station or a satellite station.

In a number of dependent claims measures are given in the system to obtain information allowing initial adjustment of the controllable antenna structure. At the primary radio station magnetic field information at its own location and its surroundings can be stored in a data base in the form of a priori known data acquired by earth magnetic field measurements at various locations, or the primary radio station can also have a similar three-dimensional sensor which then measures an absolute earth magnetic field vector. The primary radio station transmits such reference information to secondary stations as of the present invention so that an initial alignment as regards the fixed coordinate system can be made in the secondary station.

In other dependent claims embodiments are given how to establish a pointer of orientation of a secondary station as regards a primary station. Once this pointer of orientation has been established, and the controllable antenna structure is controlled such that a main antenna lobe is directed into the direction of the primary station, the secondary station can transmit with a lower power because a directional antenna is then used instead of an omnidirectional antenna. In the event of an imminent loss of an established communication link or even a loss of the link, e.g., because the secondary radio station nters a radio shadow, the omnidirectional antenna could be used again to find a better link or to recover the link. In one embodiment, the omnidirectional antenna camps on a cell while the controllable antenna structure is used to scan different directions and carries out energy measurements in such directions to find the best link. When found, the controllable antenna structure takes over the link. In another embodiment, the secondary station transmits a set of reference signals to different directions, each signal containing a reference number and the mobile identification number. In this embodiment, the primary radio station determines the best received signal and signals back to the secondary radio station the best found direction so that the secondary radio station can adjust its pointer of orientation. At least in call mode, in which exchange of information as regards the method of according the present invention preferably is done via traffic channels, in this embodiment, such an exchange of information is preferably done using in-band signallling in the traffic channel used for the call, rather then using separate radio resources. In a TDMA-system using time slots to exchange information, e.g., voice code information, a voice codec could be used which uses the radio resource in such an efficient way that still some bits are available in the traffic time slot for in-slot signalling. In still further embodiments, the network or the secondary radio station itself determine the location of the secondary radio station in the network, and the pointer of orientation is computed on the basis of a priori known absolute earth magnetic field information at the location of the secondary radio station.

BRIEF DESCRIPTION OF THE DRAWING

The present invention will now be described, by way of example, with reference to the accompanying drawings, wherein FIG. 1 schematically shows a communication system according to the present invention.

Throughout the figures the same reference numerals are used for the same features.

DESCRIPTION OF THE PREFERRED EMBODIMENTS

Figure 1:
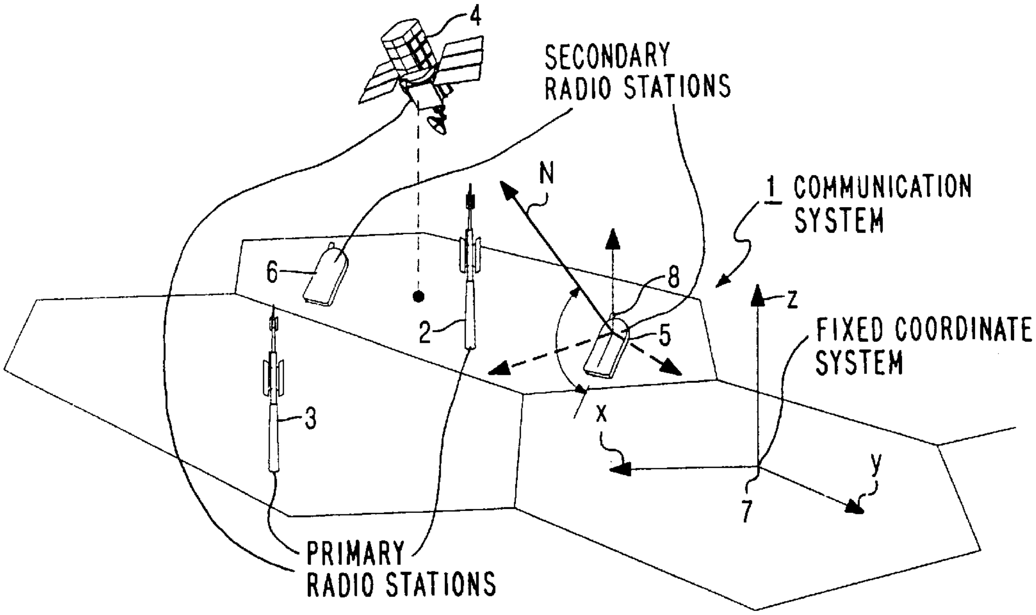

FIG. 1 schematically shows a communication system 1 according to the present invention. The system 1, which can be a terrestrial and/or satellite cellular radio system, or any other suitable communication system, using a suitable multiple access technique such as FD/TDMA and/or CDMA, or any other access technique, comprises a primary radio stations 2, 3 and 4, and secondary radio stations 5 and 6. The primary radio stations 2 and 3 are terrestrial stations linked to each other in a cellular network. The primary radio station 4 is a satellite having similar functionality as the terrestrial base stations. Further shown is a fixed coordinate system 7, which is a fixed reference for all moving stations, with perpendicular axis x, y and z. The secondary radio stations can be portable cellular radio handsets which can be freely oriented with respect to the fixed coordinate system 7. In FIG. 1 it is indicated that the main axis of secondary radio device is inclined with respect to the coordinate system x, y and z. A normal directional vector pointer N extending from the back of the secondary radio device 5 point in a direction somewhere in the free space, not pointing into a specific direction. If a controllable antenna structure, such as a phased-array structure, is installed at the backside of the secondary radio station 5, such a phased-array structure being used for beam forming, and a main lobe of the relatively narrow beam initiallypoints into the direction of the normal N, it would be unlikely that a primary radio station in the network optimally receives signals from the secondary radio station 5. The present invention provides measures to control the beam of a controllable antenna structure. Further shown (in FIG. 2) is an omnidirectional antenna 8. As will be described in the following, the controllable antenna structure can be a phased-array antenna using beam forming or a set of slectable antennae pointing into different directions.

Figure 2A:
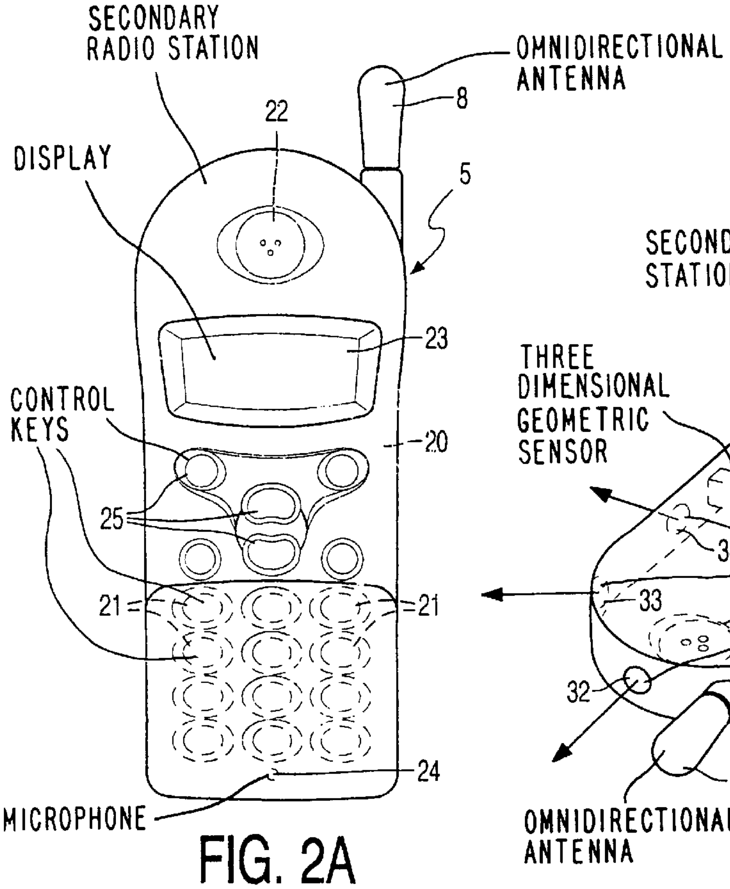
FIG. 2A shows a front view of a secondary radio station.

FIG. 2A shows a front view of the secondary radio station 5 with a housing 20 which comprises a plurality of control keys 21 at the front. The secondary station 5 is a portable cellular or cordless phone, or any other suitable portable communication device, comprising the omnidirectional antenna 8, a loudspeaker 22, a Display 23, and a microphone 24. For on/off control and menu control further control key 25 are shown.

Figure 2B:
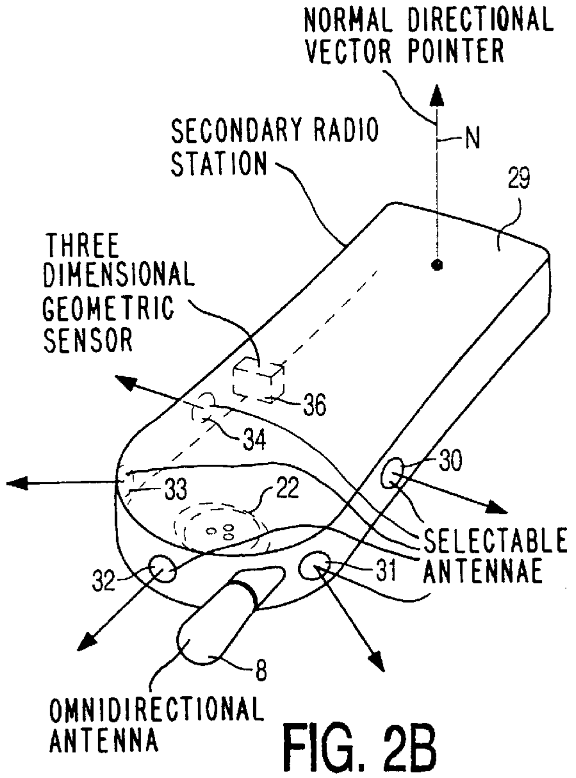
FIG. 2B shows a perspective view of a secondary radio station according to the present invention, FIG. 3 schematically shows sensing elements of a three-dimensional geomagnetic sensor for use in a primary or secondary radio station according to the present invention.

FIG. 2B shows a perspective view of the secondary radio station 5 according to the present invention, the normal directional pointer N extending from a backside 29 of the secondary radio station 5 perpendicular to the backside 29. In addition to the omnidirectional antenna 8, a controllable antenna structure is shown comprising a set of selectable antennae 30, 31, 32, 33, and 34, being ceramic diskcs, for instance. As shown in FIG. 2B, the antennae point into different directions, covering all orthogonal directions with respect to the normal N. By properly selecting at least one of the antennae, dependent on the orientation secondary radio station 5, it can be achieved that a selected antenna with a the maximum of antenna's radiation beam is directed into the direction of a primary radio station, as desired. A multitude of antennas attached in a small sized portable equipment does not affect the directivity of a single antenna because of the loose mutual electromagnetic coupling, representing a coupling loss of approx. 30 dB or more between the antennas. This coupling has no strong effect on the 3–6 dB directive gain of each antenna. Instead of a set of selectable antennae, a phased-array antenna could be used such as described in detail in said handbook of Fujimoto, though miniaturised. The phased-array antenna can be integrated in the construction of the secondary radio device 5. In an embodiment, radiating antenna elements could be coupled to microstrip lines in the station 5 for coupling RF-signals to the elements. A ground plane of the microstrip structure could be placed at the inside of the back 29 so that virually all radiation from the station 5, when in transmit mode, points into a hemisphere around the normal N, away from a head of a subscriber (not shown) using the secondary radio station 5. At page 441, in FIG. 6.66 of said handbook of Fujimoto, an antenna element of a phased-array antenna is shown. The secondary radio station 5 further comprises a three-dimensional geometric sensor 36 placed at a suitable location within the station 5, e.g., on a PCB (Printed Circuit Board) containing other circuitry.

Figure 3:
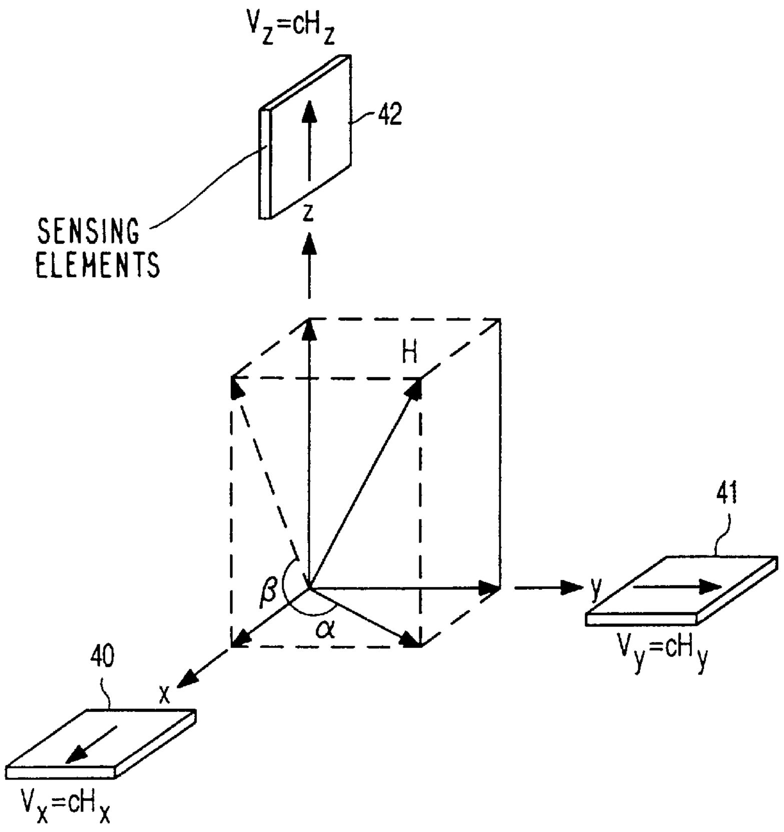

FIG. 3 schematically shows sensing elements 40, 41, and 42 of the three-dimensional geomagnetic sensor 36 for use in the secondary radio station 5, or, as will be described in the following, in a primary radio station according to the present invention. The sensing elements 40, 41, and 42 can be anisotropic magneto-resistive elements, for instance. As is described in the still not published European patent application, the sensing elements can be made sensive to a magnetic field in a particular direction in the plane of the sensing element. A sensing signal is then produced which is proportional to the magnetic field in that direction. In FIG. 3 this is indicated with $V_x=cH_x$, $V_y=cH_y$, and $V_z=cH_z$, V indicating a sensing voltage, and H indicating a magnetic field component. As shown, the magnetic field components are spatially independent components of the sensed magnetic field. When building a three dimensional sensor with AMR sensing elements alone, two of such sensors can be put on a single planar substrate and the third one on a substrate perpendicular to said substrate plane. If one of the sensing elements is a Hall-effect sensing element, all elements can be put on a single planar substrate. The sensing signals can be sampled using analog-to-digital converters, and the sampled signals can be processed by a microcontroller (not shown) so as to derive both angular and magnitude information as regards the sensed local magnetic field, a superposition of the earth magnetic field and local disturbance signals. For obtaining a better sensitivity in all orientations, more than three sensing elements could be taken, the sensing signals being properly combined to obtain the desired magnetic field information. Such a combination is straight forward and deterministic. The magnetic field information acquired in the secondary radio station is used to control the controllable antenna structure in real time, directional adjustments being done in a relative way. Herewith, a very robust control is achieved. The mobile radio handset could even be used as a pointing device for further applications such as a laptop computer or the like, as described in said European patent application No. 97202104.2.

Figure 4:
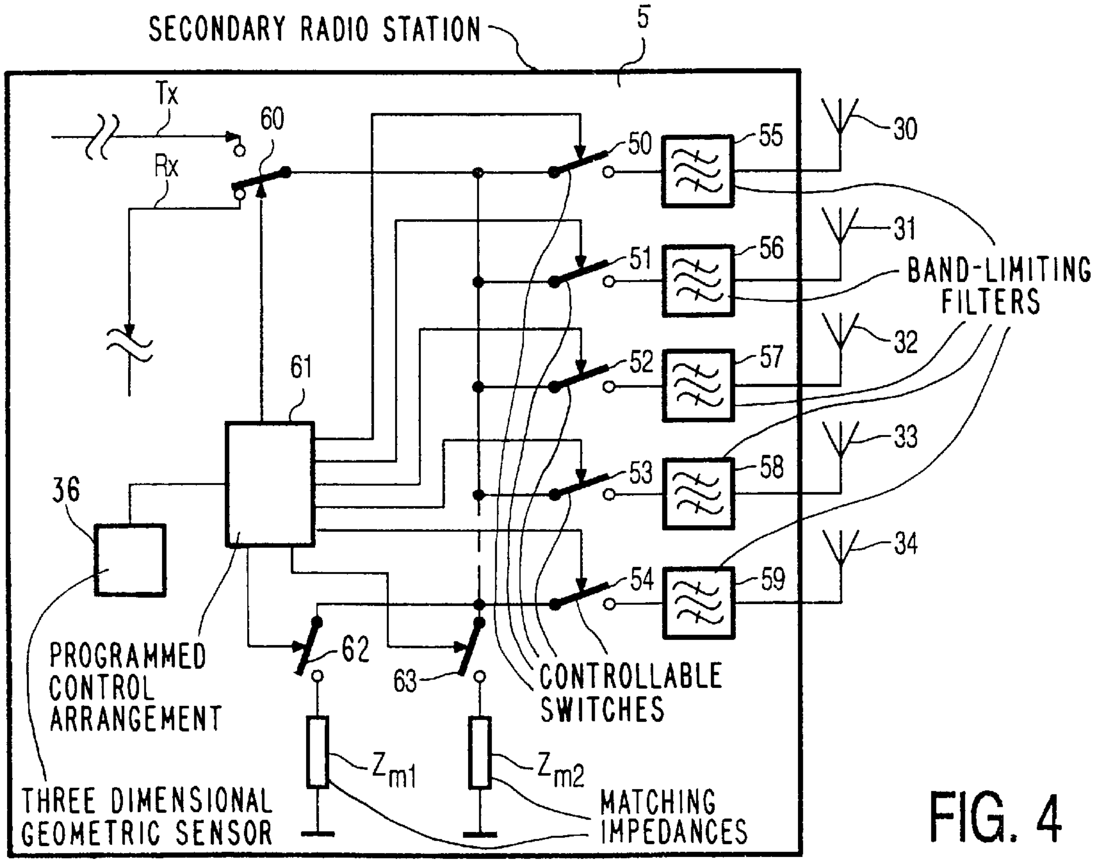
FIG. 4 shows a block diagram of a controllable antenna structure in a secondary radio station according to the present invention.

FIG. 4 shows a block diagram of an embodiment of the controllable antenna structure in the secondary radio station 5 according to the present invention. The selectable antennae 30 to 34 are respectively coupled to controllable switches 50, 51, 52, 53, and 54 via band-limiting filters 55, 56, 56, 58, and 59, respectively, and to a duplex switch 60 for coupling the antenna structure to a receive branch Rx or to a transmit branch Tx. The further structure receive and transmit branches of the secondary radio station 5 is well-known and not shown in detail here. For the same reason, the structure of the primary station is not shown in detail. A suitably programmed control arrangement 61 controls the antenna structure on the basis of the acquired sensing information and on the basis of information acquired from a primary station via the air interface, as described in the introduction of the present patent application and as claimed. The narrow bandwidth character of the antennae, together with the coupling circuitry contitutes an adequate filtering for the noise and harmonics generated by the switches 50 to 54, and further by switches 62 and 63 for switching matching impedances $Z_{m1}$ and $Z_{m2}$ parallel to a selected antenna element. With the shown antenna structure, five different radiation directions can be selected. If more different directions are desired, combinations of two antennae can be connected in parallel, matching being done with $Z_{m2}$ instead of $Z_{m1}$ which is used to match one antenna at a time to the transceiver circuitry.

Figure 5:
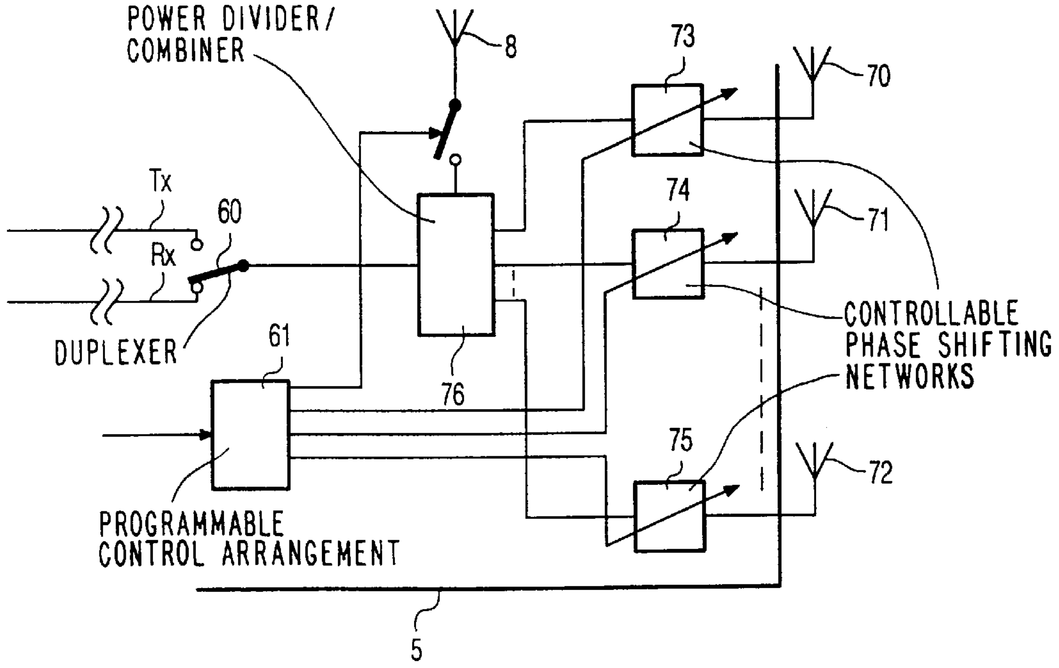
FIG. 5 shows another embodiment of a controllable antenna structure in a secondary radio station according to the present invention.

FIG. 5 shows another embodiment of the controllable antenna structure in the secondary radio station 5 according to the present invention, in the form of a phased-array antenna comprising antenna elements 70, 71, and 72 coupled to the duplexer 60 via controllable phase shifting networks 73, 74, and 75 and a power divider/combiner 76. The omnidirectional antenna 8 can also be controlled by the control arrangement 61.

In the event that a communication link is identified to be a voice connection with an earpiece of the equipment further being identified as the output device and, consequently, the equipment likely to beused agains a human head, the use of certain antenna directions can be limited or limited to take place only at a certain maximum power level. In such a case, the system can identify the best primary station according to this directional discrimination. Additionally, in the case of primary station appearing in the direction of human head, the voice connection can be switched over to an isotropic antenna. Accordingly, these limitations would not apply for antoher type of connection.

Functioning of some of the embodiments has been described in the introduction of the present patent application. Signalling of information between primary and secondary radio stations, as decribed, is done via control channels and/or traffic channels. At the side of the secondary radio station, processing and control is done in the control arrangement 61, which contains a suitably programmed read-only memory, random access memory, and an input/output interface comprising analog-to-digital converters, digital-to analog converters, binary inputs and output, or any other necessary I/O-interface for interfacing the sensors and switching devices. Generally, such a device is a suitably programmed microcontroller.

For establishing the pointer of orientation of a secondary station as regards a primary station, various embodiments were described in the introduction of the present application. Basically, establishing the pointer of orientation means selecting a proper antenna element of the selectable antenna structure as decribed with FIG. 4 or adjusting the phased-array antenna structure as described with FIG. 5.

In one embodiment, in a TDMA-system of transmission and receiving via time slots, using the selectable antenna structure, the secondary radio station 5 scans is the various directions, either by receiving a signal with the omnidirectional antenna 8 in a time slot and using the other antenna 30 to 34 during other time slots to establish the direction of the best scanned signal. A criterion for a best signal can be the highest received signal energy, or a transmission quality, such as a BER (Bit Error Rate) to be determined after signal demodulation. The advantage of this embodiment is that reception via only one antenna element at a time is required.

Via additional processing and averaging effects of multipath fading and reflection can be eliminated. The primary station can signal used transmission frequencies to the secondary station 5 so that the secondary radio station can do proper energy versus direction measurements, or respectively, transmission quality vs. direction measurements. If none of the scanned directions gives better than other directionresults, the secondary radio station can continue to receive and transmit via its omnidirectional antenna 8. The received signal energy based measurement is preferred method because it gives instantaneous results.

In another embodiment, the secondary radio station 5 sends to a primary station a set of reference signals with known contents such as number of the direction and the secondary stations identification. In a TDMA-system, a sufficient number of directions can be applied, while varying the time slot, sub-dividing the time slot into shorter slots for radio station's different antenna directions and frequency channel and repeatedly transmitting the message. Herewith, the primary radio station can detect the best received direction. The primary station signals back this best direction, with an index number of the direction. This sub-division of a time slot into further time slots can be done within the existing GSM and other systems because only the message contents need to be modified, but the transmission is continuous and addresses to a single primary station. While transmitting, the secondary station registers its orientation with respect to magnetic field by measurements. Herewith, the control arrangement 61 can determine the antenna the radiation of which points nearest to the primary station and can establish the further procedures of selecting proper antennas or adjusting a phased array. When the orientation of secondary station changes, the station observes this change via its magnetic sensors and can select the proper antenna or adjust its phased antenna array and this maintain the maximum of its radiation towards the desired primary station. In still another embodiment, the location of the secondary radio station 5 is determined, by detecting its absolute geographical co-ordinates. Location methods for mobiles are well-known. In the European patent application EP 0 800 319, a location method based on triangulation is described, but location determination can also be based on GPS (Global Positioning System)-information. In a triangulation method, also the distance between the primary and the secondary station is determined. On the basis of a priori stored absolute earth magnetic field vectors in the primary station, as a function of its geographic location, the secondary station 5 can determine the pointer of orientation.

In all embodiments, usual procedures can be carried out such as changing to a different base station if it is a better one, or assisting in handover by sending singanl strength measurement reports to the network. Furthermore, while being connected to one primary station, the secondary station can perform or can be instructed to perform directional and quality measurements related to other primary stations and thus change to other primary stations when moving towards its coverage area, for instance.

Figure 6:
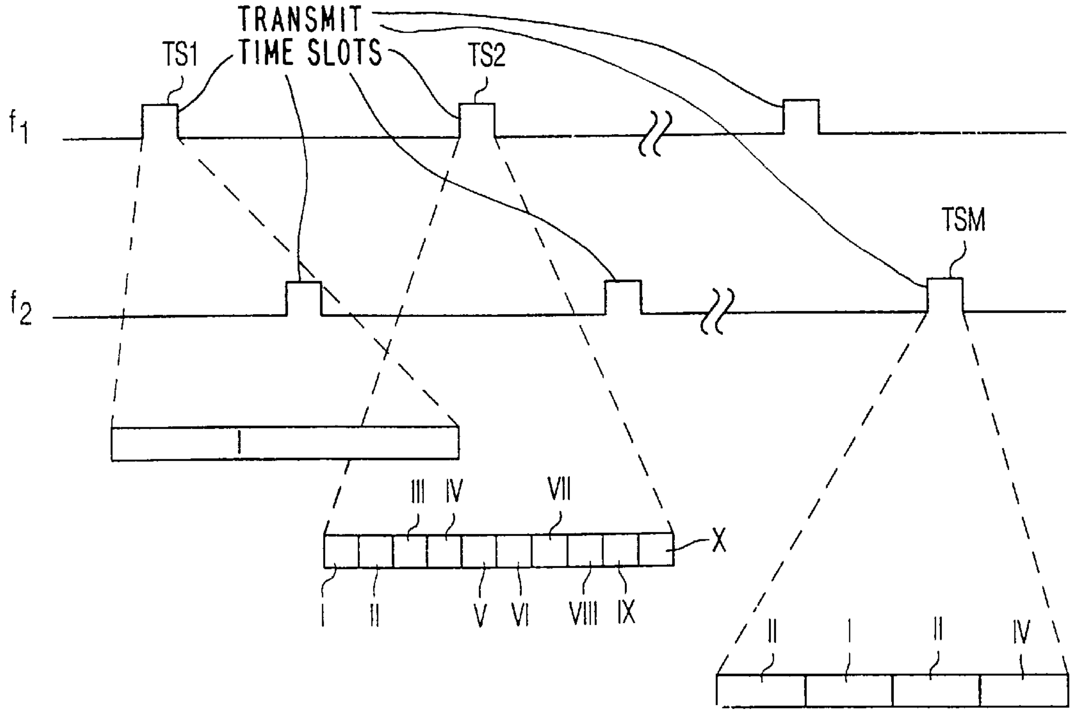
FIG. 6 shows time slot structures in an embodiment of the present invention.

FIG. 6 shows time slot structures in an embodiment of the present invention used for averaging off changes in received signal strength versus antenna direction. This is done via detection from repeated measurements in suitable intervals and time slots, and if needed, varying the combinations of antenna directions in order to ease the reception of the desired signal by using the best known antenna direction, by examining the surroundings of said best known direction so as to adapt to changes in the position or orientation of the secondary radio station 5, and by distinguishing between possibly several primary radio stations using the same frquency and time slot but appearing in different directions as regards the secondary radio station 5.

To this end, in FIG. 6, transmit time slots of a primary radio station are shown af the frequencies $f_1$ and $f_2$. A time slot TS1 is received by the secondary radio station 5 while using the best known antenna direction I. The recieved signal is decoded. A next time slot TS2 is recieved for measuring the received energy of all possible antenna directions of the secondary radio station 5. This is indicated with the number Roman I through Roman X. Furthermore, in a time slot TSM at the different frequency $f_2$, directions from directions I through IV are measured so as to get a better picture of the directions. In the example given, directions Roman II, I, II, IV are used for this purpose. The subdivision of time slot into sub-slots for different antenna directions can be done while maintaining a continuous transmission without any guard periods because the slot is addressed to a single primary station.

Figure 7:
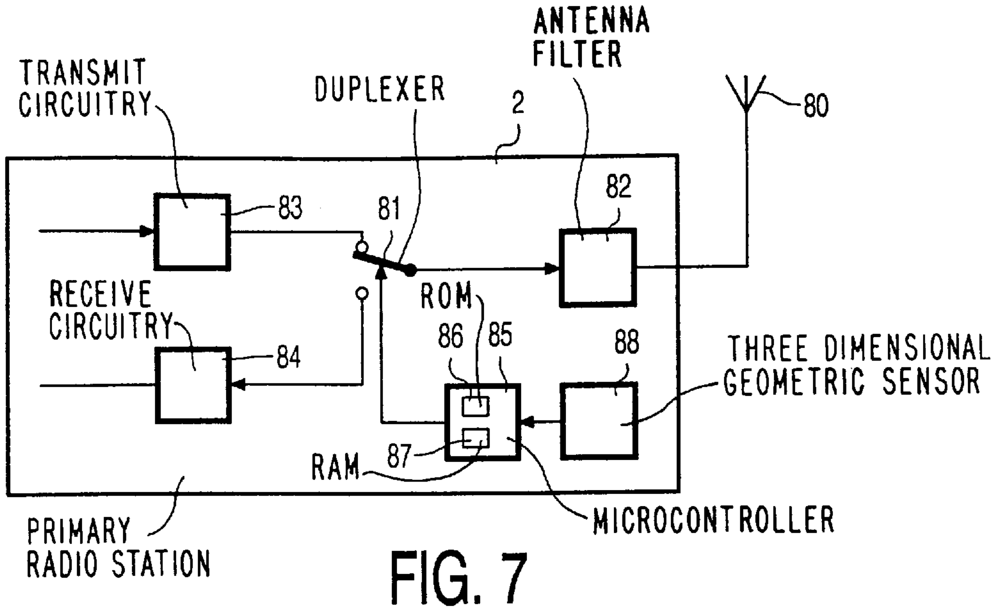
FIG. 7 shows a block diagram of a primary radio station.

FIG. 7 shows a block diagram of the primary radio station 2 which comprises an antenna 80 coupled to a duplexer 81 via an antenna filter. The duplexer is coupled to transmit circuitry 83 and to receive circuitry 84. Further shown is a microcontroller 85 having a read-only memory 86 in which programs and other fixed data are stored, and a random access memory 87 for variable data. The primary radio station can comprise a three-dimensional geomagnetic sensor 88.

Figure 8:
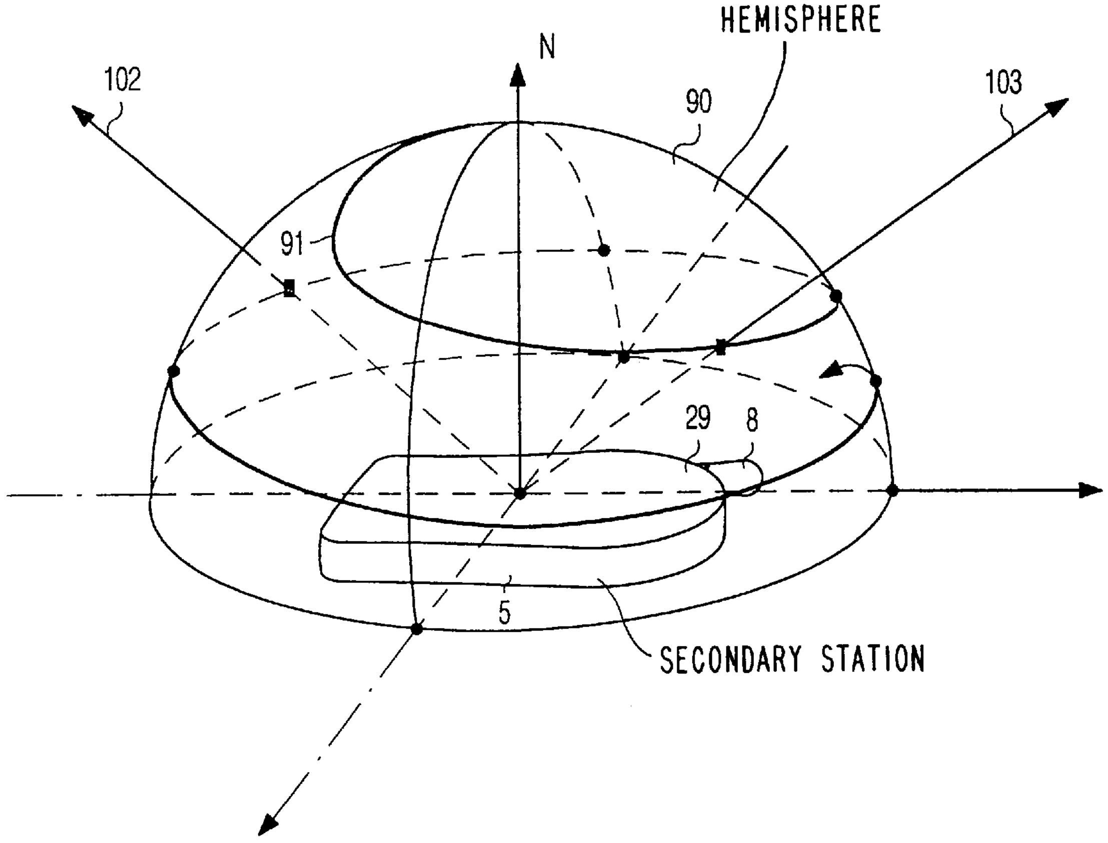
FIG. 8 shows a hemisphere extending from the back of the secondary radio station.

FIG. 8 shows a hemisphere 90 extending from the back 29 of the secondairy radio station 5. The hemisphere is shown to illustrate the operation of an embodiment of the present invention in which a phased-array antenna structure is used, as described before. For full coverage by the antenna structure of the space around the secondary radio station 5, the hemisphere may be extended to a complete sphere. According to the present invention, phase angles of the controllable phase shifting networks 70, 71, and 72 and one further phase shifting network for a fourth antenna element, as shown in FIG. 5, to control the phased-array in a predetermined way are calculated a priori and stored in a read-only memory comprised in the microcontroller 61 of the secondary radio device 5, e.g., for 128 points along a spiral 91 evolving at the surface of the hemisphere 90, or for 256 points for a complete sphere. The distribution along the spiral is chosen uniform so that a priori the whole space around the secondary radio station is covered. Such calculations are straight forward mathematical calculation with can be carried out when knowing the beam forming characteristics of the phased-array. Then, using a lookup-table, for instance, proper phase values can be looked-up to adjust the antenna beam.

Figure 9:
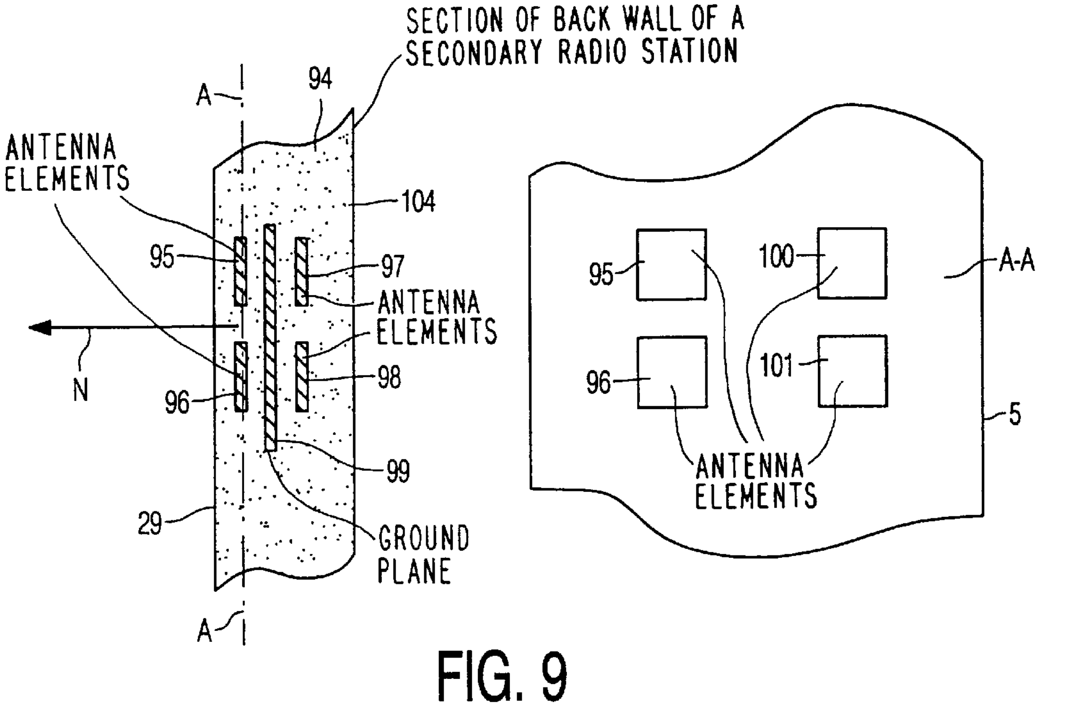
FIG. 9 shows a phased-array antenna structure integrated in a back wall of a secondary radio station.

FIG. 9 shows a phased-array antenna structure integrated in a section 94 of the back wall 29 of the secondary radio station 5. Shown are antenna elements 95, 96, 97, and 98, in microstrip technology, and a ground plane 99. Next to this section, a length section along the line A—A is shown, showing the antenna elements 95 and 96, and further antenna elements 100 and 101. The antenna elements at the outer wall 29 of the secondary radio station can point in directions falling within the hemisphere 90. Two of such directions 102 and 103 are shown in FIG. 8. The antenna elements an inner wall 104 of the secondary radio station 5 can point in directions of the other hemisphere (not shown), these directions being opposite to the direction covered by the hemisphere 90.

Figure 10:
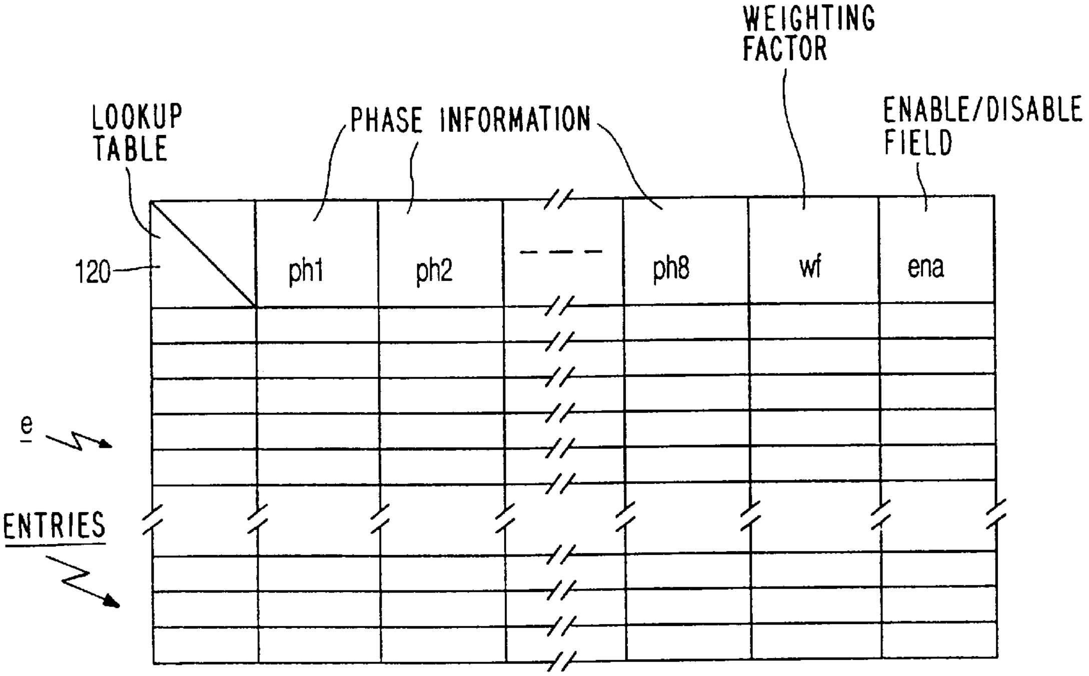
FIG. 10 shows a look-up table for looking up control values for the phased-array.

FIG. 10 shows a look-up table 120 for looking up control values for the phased-array structure as shown in FIG. 9. The table can have 256 entries e, for instance, as described, which can be scanned according to a given scanning algorithm. The entries e comprise phase information ph1, ph2, . . . , ph8 for adjusting the respective phases of the antenna elements of the phased array structure, a weighting factor wf, and an enable/disable field ena for enabling or disabling an entry. The shown lookup table is stored in RAM and is a replica of the same lookup table stored in ROM, with the addition of the fields wf and ena. When switching on the power of the secondary radio station 5, the contents of the ROM is copied to RAM. Herewith, full flexibility for control is achieved.

For an initial scan for primary radio stations, only sixteen entries, which are evenly distributed over the (hemi-)sphere are enabled. Herewith, the secondary radio station 5 has a good chance to find its surrounding primary radio stations, irrespective of its orientation. In this respect it should be realised that the secondary radio station might be upside down with its back 29 pointing in a vertical direction when not used (put on a desk), and should be able to receive incoming calls, and might be pointing into a direction in which the normal points into a rather horizontal direction when being picked up for an outgoing call. One proper camping on a cell has been achieved, entries around the entry belonging to the selected primary radio station are enabled while the other initially enabled entries are disabled. Herewith, a reference direction can be found, even with communication with the network, as in the other embodiments described. When using antenna diversity, one antenna structure steadily pointing and another antenna structure continously scanning for a better direction, even the omnidirectional antenna could be dispensed with. Such a diversity scanning is described in detail in the European Patent Application No. 0 728 372 of the same Applicant. Of course, the present embodiment can be combined with the previously described embodimens. At the same time, the three-dimensional geomagnetic sensor 36 provides relative adjustment values, as described before so that a real time adjustment can be made in the secondary radio station 5. In an embodiment, only directions in the hemisphere 90 are enabled so that all radiation points away from a head of subscriber, when the secondary radio station 5 is used. Also weighting factors wf for magnitudes of radiation could be adjusted for enabled entries, instead of full disabling, in the ROM, initially all weighting factors being set to one. Herewith, the radiation in directions pointing through and in the vicinity of the head could be attuated instead of being made fully 'dead'. Herewith, full directional flexibility is maintained. The phased-array structure consumes reduced power as regards an omnidirectional structure, due to its beam forming character. In the receive mode, all directions can be made equally sensitive, whereas the disabling and/or weighting can be done in transmit mode. Instead of points on a spiral, another smart contour could be used to cover the space around the secondary radio station 5.

In view of the foregoing it will be evident to a person skilled in the art that various modifications may be made within the spirit and the scope of the present invention as hereinafter defined by the appended claims and that the present invention is thus not limited to the examples provided. The secondary station 5 could be split, for instance, the antenna structure being put in a belt to be carried around the waist of a subscriber using the radio station 5. The other components could then be put in a mobile radio device as usual and a low power infra-red or wireless link could be applied for coupling the antenna structure and the actual mobile radio device.

What is claimed is:

1. A communication system comprising a primary radio station and a portable radio station, said portable radio station being freely three-dimensionally orientable with respect to a fixed coordinate system, said primary radio station being configured to communicate with said portable radio station, said portable radio station comprising:

a transceiver;

a controllable antenna structure coupled to said transceiver;

a three-dimensional geometric sensor for three-dimensionally sensing a local magnetic field;

a beam directional controller, said beam directional controller being coupled to said controllable antenna structure, and said beam directional controller being configured to three-dimensionally control with respect to a main axis of said portable radio station of a beam radiated by said controllable antenna structure on the basis of said sensed local magnetic field, such that, after an initial adjustment of said beam of said controllable antenna structure to a predetermined three-dimensional direction with respect to said main axis, said controllable antenna substantially retains said beam directed into said predetermined three-dimensional direction, irrespective of a subsequent orientation of said portable radio station with respect to said fixed coordinate system.

2. A communication system as claimed in claim 1, wherein the system comprises means for establishing a reference direction, the predetermined direction three-dimensionally deviating from the direction of the local magnetic field by a given amount.

3. A communication system as claimed in claim 2, wherein, in idle mode, the secondary station is camping on the primary radio station, the primary station being configured to transmit locally obtainable magnetic field information to the portable radio station, the portable radio station using the local magnetic field information from the primary radio station as the reference direction.

4. A communication system as claimed in claim 3, wherein the primary radio station comprises storage means for storing local magnetic field information, said local magnetic field information being acquired for the primary radio station and for surroundings of the primary radio station on the basis of a priori measurements and knowledge about an earth magnetic field.

5. A communication system as claimed in claim 3, wherein the primary radio station comprises another three-dimensional sensor for three-dimensionally sensing a local magnetic field with respect to fixed geographical directions.

6. A communication system as claimed in claim 1, wherein the system comprises means for establishing a pointer of orientation from the portable station to the primary radio station for allowing a communication between the primary station and the portable radio station, said beam being a narrow antenna beam.

7. A communication system as claimed in claim 6, wherein the portable radio station comprises an omnidirectional antenna used for initial camping on at least said primary radio station, the controllable antenna structure initially being controlled such that different beam directions are scanned, and, upon carrying out by said primary radio station of signal quality measurements on radio signals from said different beam directions, the controllable antenna structure is controlled such that a direction of of said beam coincides with a direction of best signal quality measurent among said signal quality measurements.

8. A communication system as claimed in claim 7, wherein the portable radio station is configured to transmit a set of reference signals into said different beam directions, the primary radio station being configured to signal back said direction of best signal quality measurement, and the portable radio station being configured to adjust the pointer of orientation into the signalled back direction.

9. A communication system as claimed in claim 6, wherein said portable radio station switches between a number of different antenna directions while using sub-slots of a time slot, each of said sub-slots representing an antenna direction to be measured.

10. A communication system as claimed in claim 6, wherein the system comprises means for establishing a geographical location of the portable radio station in the system, the primary radio station is configured to compute the pointer of orientation with respect to stored local magnetic field information, and the computed pointer of orientation is transmitted to the portable radio station.

11. A communication system as claimed in claim 6, wherein the the system comprises means for establishing a geographical location of the portable radio station in the system, the primary radio station is configured to transmit stored local magnetic field information to the portable radio station, and the portable radio station is configured to compute the pointer of orientation with respect to received local magnetic field information.

12. A communication system as claimed in claim 6, wherein the portable radio station switches over from idle mode to call mode, information exchange between the primary radio station and the secondary station as regards maintenance of the pointer of orientation being done via additional signaling with combined use of a traffic channel used in said call mode and of a control channel used in said idle mode.

13. A communication system as claimed in claim 1, wherein the controllable antenna structure comprises a plurality of antennas, the portable radio station identifies from a communication type and an acoustic interface usage whether particular ones of said plurality of antennas mainly radiate into a direction of a person operating the portable radio station, and the portable radio station has blocking means for blocking usage of said particular ones of said plurality of antennas.

14. A communication system as claimed in claim 1, wherein said three-dimensional geometric sensor produces three spatially independent components of said local magnetic field, and said beam is controlled on the basis of said produced three spatially independent components.

15. A primary radio station for use in a communication system comprising said primary radio station and a portable radio station for communicating with said primary radio station, said portable radio station being freely three-dimensionally orientable with respect to a fixed coordinate system, and said portable radio station comprising a transceiver, a controllable antenna structure coupled to said transceiver, a three-dimensional geometric sensor for three-dimensionally sensing a local magnetic field, and a beam directional controller, said beam directional controller being coupled to said controllable antenna structure, and said beam directional controller being configured to three-dimensionally control with respect to a main axis of said portable radio station of a beam radiated by said controllable antenna structure on the basis of said sensed local magnetic field, such that, after an initial adjustment of said beam of said controllable antenna structure to a predetermined three-dimensional direction with respect to said main axis, said controllable antenna substantially retains said beam directed into said predetermined three-dimensional direction, irrespective of a subsequent orientation of said portable radio station with respect to said fixed coordinate system, said primary radio station comprising:

means for acquiring local magnetic field information; and means for transmitting said acquired local magnetic field information to said portable radio station, said portable radio station using received local magnetic field information for said initial adjustment.

16. A portable radio station for use in a communication system comprising a primary radio station and said portable radio station, said portable radio station being freely three-dimensionally orientable with respect to a fixed coordinate system, said primary radio station being configured to communicate with said portable radio station, said portable radio station comprising:

a transceiver;

a controllable antenna structure coupled to said transceiver;

a three-dimensional geometric sensor for three-dimensionally sensing a local magnetic field;

a beam directional controller, said beam directional controller being coupled to said controllable antenna structure, and said beam directional controller being configured to three-dimensionally control with respect to a main axis of said portable radio station of a beam radiated by said controllable antenna structure on the basis of said sensed local magnetic field, such that, after an initial adjustment of said beam of said controllable antenna structure to a predetermined three-dimensional direction with respect to said main axis, said controllable antenna substantially retains said beam directed into said predetermined three-dimensional direction, irrespective of a subsequent orientation of said portable radio station with respect to said fixed coordinate system.

17. A communication method for use in a communication system comprising a primary radio station and a portable radio station, said portable radio station being freely three-dimensionally orientable with respect to a fixed coordinate system and said portable radio station comprising a controllable antenna structure, said primary radio station being configured to communicate with said portable radio station, said communication method comprising:

sensing a local magnetic field with a three-dimensional geometric sensor;

with respect to a main axis of said portable radio station three-dimensionally controlling a beam radiated by said controllable antenna structure on the basis of said sensed local magnetic field, such that, after an initial adjustment of said beam of said controllable antenna structure to a predetermined three-dimensional direction with respect to said main axis, said controllable antenna substantially retains said beam directed into said predetermined three-dimensional direction, irrespective of a subsequent orientation of said portable radio station with respect to said fixed coordinate system.

* * * * *